April 26, 1949.  S. D. BROWNING  2,468,028

METHOD AND APPARATUS FOR TESTING DIRECTION FINDERS

Filed May 12, 1945  2 Sheets-Sheet 1

INVENTOR.
S. D. BROWNING
BY
Robert Hardin Jr.
ATTORNEY

April 26, 1949.　　　S. D. BROWNING　　　2,468,028
METHOD AND APPARATUS FOR TESTING DIRECTION FINDERS
Filed May 12, 1945　　　　　　　　　　　2 Sheets-Sheet 2

INVENTOR.
S. D. BROWNING
BY
Robert Harding Jr.
ATTORNEY

Patented Apr. 26, 1949

2,468,028

UNITED STATES PATENT OFFICE 2,468,028

METHOD AND APPARATUS FOR TESTING DIRECTION FINDERS

Samuel D. Browning, Essex Fells, N. J., assignor to Federal Telephone and Radio Corporation, New York, N. Y., a corporation of Delaware Application May 12, 1945, Serial No. 593,495

19 Claims. (Cl. 343—113)

This invention relates to a testing device for direction finders which is simple and efficient in operation and which is designed to eliminate the necessity of setting up in the field one or more directional antenna systems.

One of the objects of the invention is a circuit arrangement for producing voltages of the proper amplitude and phase to simulate the effect of an Adcock or cross loop antenna system.

Embodiments of this and other objects of the invention are illustrated in the accompanying drawings in which.

Figure 1:
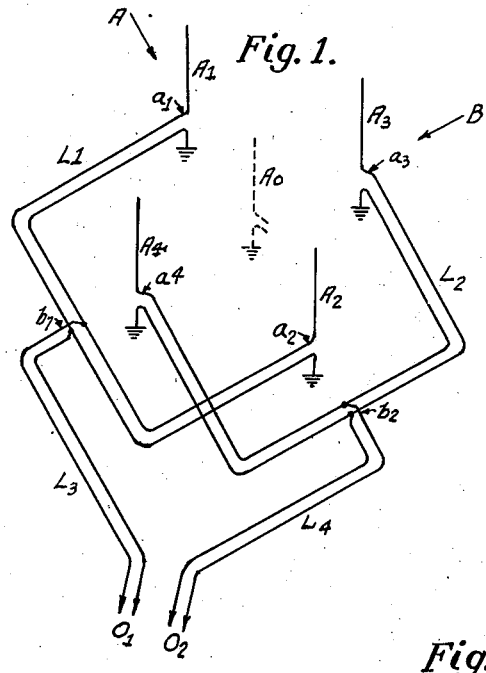
Fig. 1 shows an array of crossed Adcock pairs, the effect of which is to be simulated.

Fig. 1 shows an array of crossed Adcock pairs consisting of four antennas forming the pairs $A_1$—$A_2$ and $A_3$—$A_4$. The two antennas of a pair are connected so that their outputs oppose each other by means of the interconnecting lines, $L_1$ and $L_2$. The outputs from these interconnected pairs are taken off by the lines $L_3$ and $L_4$ connected to the mid-point of the two interconnecting lines $L_1$ and $L_2$.

The outputs from the four antennas at the points $a_1$, $a_2$, $a_3$, and $a_4$ are of equal amplitude regardless of the direction of the oncoming signal. The phase relationship of the outputs of the two antennas of a pair depend upon the direction of arrival of the oncoming signal with respect to the plane containing the two antennas of a pair. For example, consider the pair $A_1$—$A_2$ together with a fictitious antenna $A_0$. A signal from the direction B, at right angles to the plane of the antennas, arrives at all three antennas simultaneously. Therefore, both outputs will be in phase and will cancel at the mid-point of the interconnecting line, at point $b_1$. In the case where the signal arrives from direction A, the phase of the output from $A_1$ will lead the output from the fictitious antenna $A_0$ and the phase of the output from $A_2$ will lag the output from the fictitious antenna $A_0$. The degree of lead and lag, or the phase difference between outputs of antennas $A_1$ and $A_2$, will depend upon the physical spacing of the two antennas and the frequency, or wave length of the signal being received. Since the two outputs are out of phase with each other, they will not completely neutralize each other and therefore, there will be a residual voltage appearing at the mid-point $b_1$.

The output $O_1$ from this Adcock pair will therefore vary in accordance with the direction of the received signal. This variation will be proportional to the cosine of the angle of the plane of the two antennas to the direction of arrival of the signal.

The other Adcock pair is similarly arranged and operates in a like manner. However, since it is oriented at an angle of 90° from the first Adcock pair, the effects produced in the output $O_2$ of this pair will be offset 90° from the effects in the output $O_1$ of the first pair.

Figure 2:
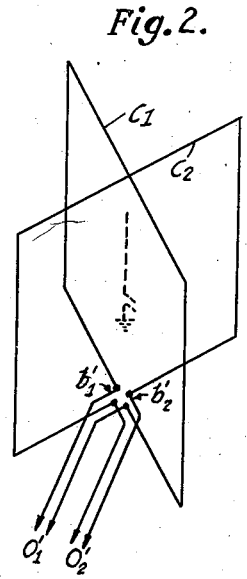
Fig. 2 shows two similarly operating crossed loops.

Fig. 2 shows two crossed loops $C_1$, $C_2$. The operation of these loops can be shown to be similar to that of two crossed Adcock pairs by considering the four vertical portions of the loop windings as the counterpart of the four Adcock antennas. The top and bottom portions of the loop windings take the place of the interconnecting lines $L_1$ and $L_2$ of the Adcock pairs. The outputs $O_1'$ and $O_2'$ obtained at points $b_1'$ and $b_2'$ will correspond and vary in the same manner as the outputs from the Adcock pairs at points $b_1$ and $b_2$.

Figure 3:
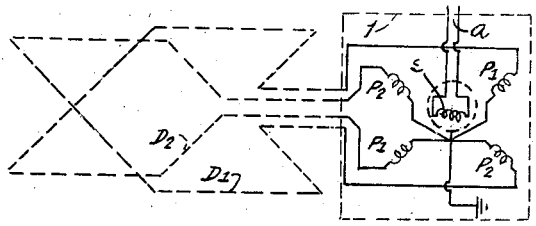
Fig. 3 shows diagrammatically a direction finder employing radio goniometric coils such as are used for coupling with a pair of crossed loop or Adcock antennae.

In Fig. 3, a goniometer equipment 1 is connected with a pair of crossed loop antennae shown in dotted lines at $D_1$, $D_2$. Equipment 1 contains associated primary coupling units $P_1$, $P_2$, and a secondary coupling unit or rotor S which has an output circuit $a$ and is rotatable around an axis perpendicular to the plane of the drawing. Each antenna delivers to its associated coupling unit a constant voltage irrespective of the angular position of a transmitter from the center point of the antenna pair $D_1$, $D_2$. It is the relative phase between each of these voltages which varies with different positions of the transmitter around the pair. This effect of phase variation between the two voltages of a pair of loop or Adcock antennae can be reproduced by an arrangement combining two units such as shown in Fig. 3. This is shown in Fig. 4.

Figure 4:
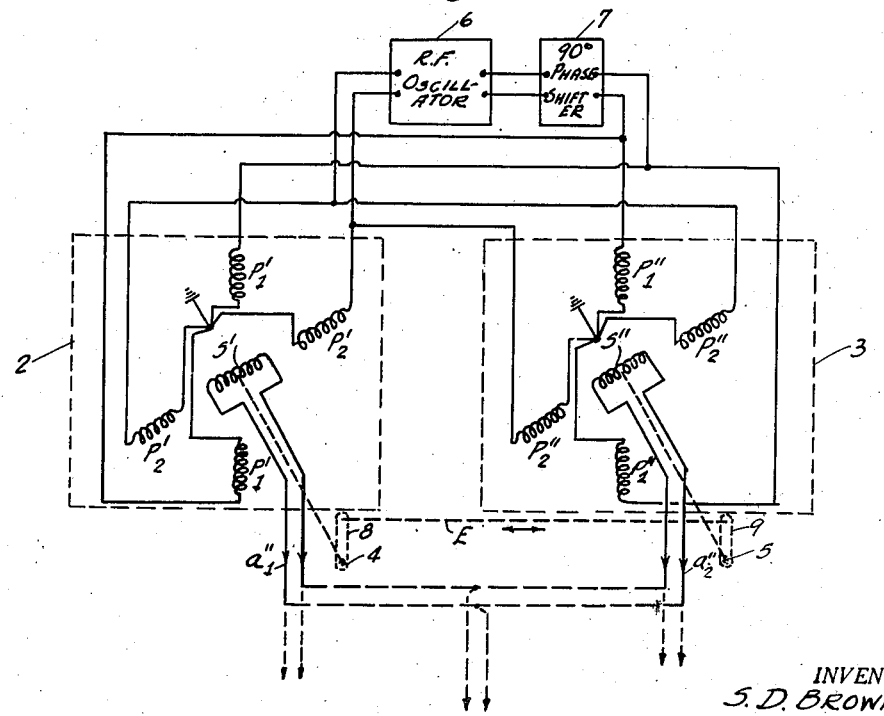
Fig. 4 shows the mounting to two radio goniometers for simulating the effect of a crossed loop or Adcock antenna system.

In Fig. 4, the two units are designated at 2 and 3 having rotor shafts 4, 5, respectively. The corresponding stationary coils $P_1'$, $P_2'$ and $P_1''$, $P_2''$ of the two goniometers 2, 3 are interconnected in opposite polarity. One pair of interconnecting coils is fed directly from an R. F. oscillator 6, the other also is fed from this same oscillator but through a 90° phase shifting network 7. First consider the left-hand goniometer 2 alone. We have shown here a goniometer whose rotatable secondary coil S' is at maximum coupling with respect to the stationary coil $P_2'$ fed directly from the oscillator 6. This would place it at O coupling with respect to the other stationary coil $P_1'$ fed by currents shifted 90° from the currents in the first coil $P_2'$. Assume that the output $a_1''$ from this secondary S' is in phase with the currents from the oscillator 6. If now the secondary S' is rotated from this position, there will be current induced into its winding from the out-of-phase coil $P_1'$. This current will either lead or lag the currents induced by the in-phase coil $P_2'$, depending upon the direction of rotation. As this secondary coil S' is oscillated back and forth on either side of the position shown, it will be found that the output $a_1''$ from the coil will be at a constant amplitude, but the phase of the currents will vary with respect to the reference current from the R. F. oscillator 6. This variation in phase will be proportional to the cosine of the angle of the plane of the stationary coil $P_2'$ to the plane of the rotating coil S'. Referring back to the description of the output from an antenna of an Adcock pair with respect to the output of the fictitious antenna, we will see that the output from the goniometer secondary S' varies precisely in the same manner when it is oscillated through a given range on either side of the plane of the stationary coil $P_2'$.

Since the second goniometer 3 is cross connected to the first goniometer 2, it will be apparent that the output $a_2''$ from the second goniometer, will vary in the same manner as the output from the first goniometer, except that the phase shift will be in the opposite direction. This corresponds precisely to the output from the second antenna of an Adcock pair. Therefore, if we interconnect the outputs $a_1''$, $a_2''$ of the two goniometer secondaries S', S'' in opposition and take an output $O_1''$ from the mid-point of that interconnection, the output obtained will vary in precisely the same manner as does the output from an interconnected Adcock pair.

It is evident that if we set up a second pair of goniometers, interconnected in the same fashion and feed them from the same oscillator and phase shifting network, and then, in a suitable manner, oscillate the secondary coils of this second pair of goniometers 90° out of phase with the first pair, we can obtain four outputs from the individual secondaries whose phase relationships will vary precisely as would the four outputs from the antennas of two crossed Adcock pairs. Furthermore, if the secondary coils of each pair of goniometers were cross connected, the outputs from the mid-point of those cross connections would vary precisely the same as the outputs from two crossed Adcock pairs or the outputs from two crossed loops.

These outputs can then be utilized as a substitute for antennas in the testing of direction finder equipments.

There are several ways in which the goniometers can be mounted and their secondaries be given an oscillatory motion. They can be mounted coaxially with their shafts in line and coupled together in proper angular relationship. This shaft assembly can then be given a sinusoidal oscillatory movement by a suitable mechanical connection to a 360° dial.

The goniometers can also be mounted side by side, as shown in Fig. 4, their shafts 4, 5 provided with suitable lever arms 8, 9 and interconnecting links schematically indicated by dotted line E and be driven in a substantially sinusoidal manner as schematically shown in Fig. 3.

Other schemes will occur to those mechanically minded. The requirement is that the shafts be oscillated back and forth in a sinusoidal manner between adjustable angular limits.

When the lever arms 8, 9 are moved from their 90° position through a given angle in a clockwise direction, the amplitudes of the output voltages will not change, but the phase of the currents from one goniometer will be advanced while the phase of the currents from the other goniometer will be retarded an equal amount. If the lever arms are rotated counterclockwise the same angle from the 90° position, the phases of the output currents will be shifted in the opposite direction by an equal amount. If, then, the arms 8, 9 are oscillated back and forth equally on either side of the 90° position by a simple periodic and especially sinusoidal motion, the voltage variations in the output circuits $S_1$, $S_2$ of goniometers, A, B will be exactly like those occurring at the base of a pair of Adcock antennae as a transmitter is rotated at a constant rate and at a constant distance from the center point, around those two Adcocks.

In certain direction finders, two such pairs of Adcocks are employed, set at 90° to each other. In accordance with the invention, two such pairs of goniometers are made with equal lever arms, etc., and their link members are oscillated back and forth, but 90° out of phase; the outputs from the two pairs of goniometers exactly duplicate the variations in the outputs from the two pairs of antennae of the direction finder equipments. The device can, therefore, be used as a dummy collector to feed proper voltages to four antennae coupling units. It is convenient that this movement be imparted by a shaft rotatable through 360° and having mounted thereon a dial calibrated in 360°.

Figure 5:
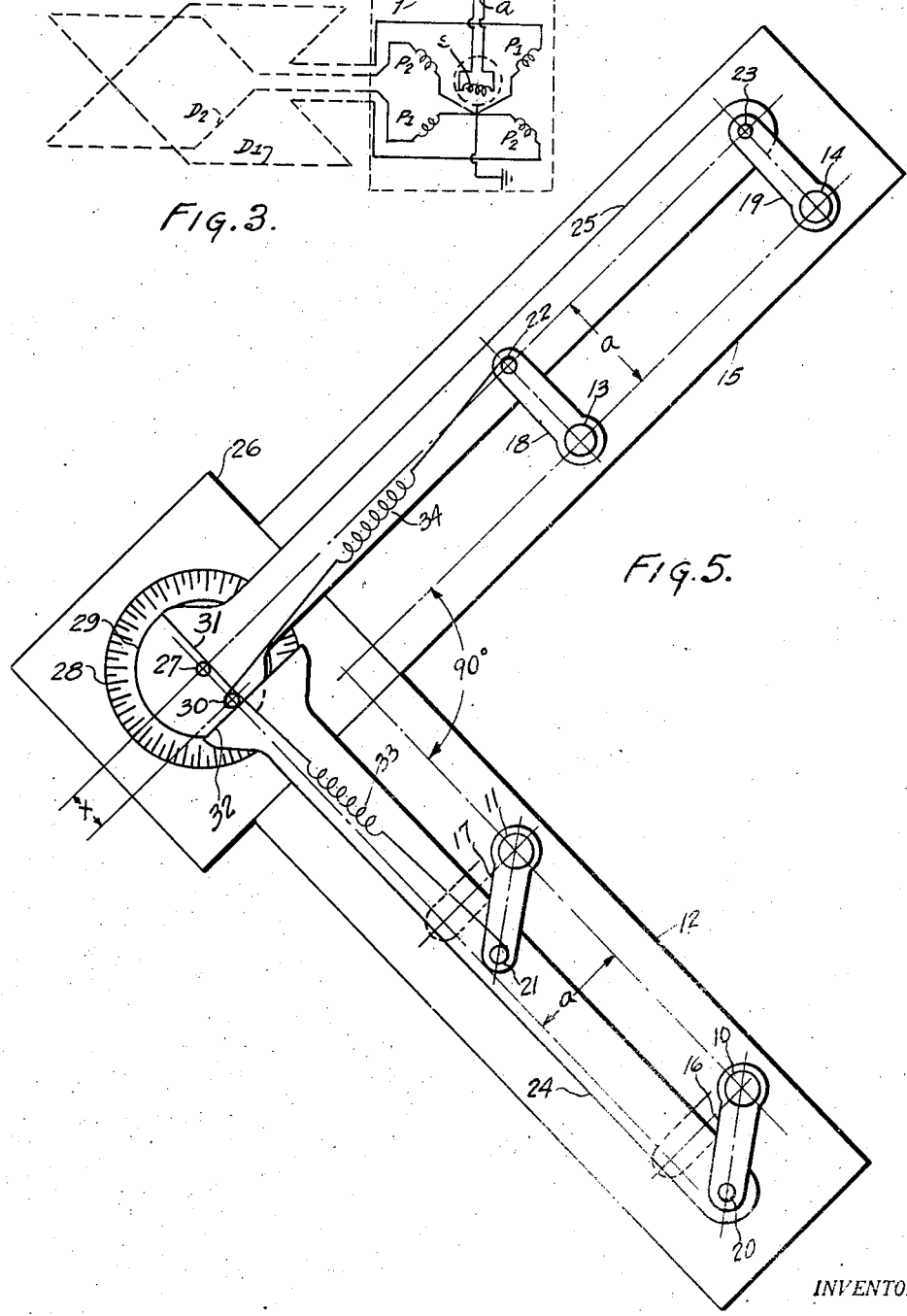
Fig. 5 shows a mounting of four radio goniometers for simulating the effect of a crossed loop or Adcock antenna system.

Such an arrangement is shown in Fig. 5. In this device, certain dimensions and design requirements are stressed in order that pure harmonic or sinusoidal motion be imparted to the lever arms on the goniometer shafts; otherwise the results will not be correct. In other words, the proper design of the mechanical linkage and driving system is of utmost importance.

In Fig. 5 each pair of goniometers is mounted on a metal strip of, say, ¼ inch by 4 inches long. Rotor shafts 10, 11 are mounted on metal strip 12, and rotor shafts 13, 14 are mounted on a similar metal strip 15. Each of the rotor shafts 10, 11 and 13, 14 has attached thereto lever arms or cranks 16, 17 and 18, 19, respectively. Each of the cranks is provided with a pin shown at 20, 21 and 22, 23, respectively. The crank pins are located at exactly the same radial distance from the center of the associated goniometer shafts. The crank pins of each pair, 20, 21 and 22, 23, respectively, are interconnected by a link member 24, 25, respectively; the crank pins are mounted in bearing holes which are spaced a distance equal to the spacing of the centers of the associated goniometer shafts. The spacings on each pair of goniometers are exactly the same and the radius $a$ from the shaft centers to the crank pin centers on all lever arms is exactly the same.

The two pairs of goniometers are mounted at an angle of exactly 90° to each other, for example, on adjacent sides of a square center plate 26.

With each pair of lever arms set at exactly 90° to the center line through the goniometer shaft centers, the center lines are extended through the crank pin centers of each pair to the square plate 26 and the intersection of these two center lines on the plate is marked. With this intersection as a center, a bearing is provided for an accurately fitted shaft 27 upon which is mounted a 360° bearing dial 28. Shaft 27 also carries a circular disc 29 which has a crank pin 30 located at the radius X from the center of shaft 27. This distance X will be further discussed below.

Link members 24, 25 for the first pair of goniometers are made so that they extend on one end toward the shaft 27 in the square plate 26 and provide a widened section at the end of each link member. This end, designated at 31, 32 should be machined at exactly 90° to the center line between the two crank pin holes in each link member and at a distance from the nearer pin equal to the spacing between that pin (when the crank shaft is set at 90° to the center line through the goniometer shafts) to the center of the dial shaft 27 minus the radius of the dial shaft crank pin 30. Suitable tension springs 33, 34 are provided between the dial shaft crank pin 30 and each of these link members extending preferably to the nearer goniometer crank pins 21, 22, respectively. In this way, each link member is always maintained in contact with the dial shaft crank pin 30.

A unit constructed in the manner just described and interconnected as described above forms a test equipment suitable for performing bearing tests on a great variety of direction finder equipments.

As a transmitter is rotated about a pair of Adcock antennae the maximum difference in phase between the voltages from the two antennae at any desired frequency is proportional to the antenna spacing; for a given antenna spacing, the phase difference is proportional to the frequency. In the device described, the maximum phase difference between the different goniometer outputs is related to the dimension X referred to above. This is the radius of the circle described by dial shaft crank pin 30. If, therefore, a series of holes is provided for this pin, they can be so located that the device can be adjusted to reproduce the phase shifts occurring for given antenna spacings at given frequencies.

What I claim is:

1. In a testing device for direction finders, at least one pair of radio goniometers each having stationary and movable members, a source of signal, means connecting the source to the stationary members for producing in the stationary members of the goniometers voltages of the same amplitude and of predetermined phase relationship, and a mechanical coupling between the movable members of the goniometer for maintaining a predetermined phase relationship between voltages produced in the coupled members.

2. In a testing device for direction finders, at least one pair of radio goniometers each having stationary and angularly movable members, voltage supply means, phase-shifting means, means for cross-connecting the stationary members of one goniometer in parallel to those of the other goniometer, means for connecting the signal supply means to one of the stationary members of one goniometer, means for connecting the signal supply means through said phase-shifting means to the other of the stationary members of said goniometer, and a mechanical coupling between the movable members of the goniometers for maintaining a predetermined phase relationship between voltages produced in the coupled members, the phase being varied in a continuous manner between predetermined minimum and maximum values in accordance with the angular position of the coupled members.

3. In a testing device for direction finders, at least two pairs of goniometers each having stationary and movable members, means including voltage supply means for producing in the stationary members of the goniometers of each pair voltages of substantially the same amplitude and of predetermined phase relationship, a mechanical coupling between the movable members of the goniometers of one pair for maintaining a predetermined phase relationship between voltages produced in the coupled members, the phase being varied in a continuous manner between predetermined minimum and maximum values symmetrically arranged about a zero value, and an additional mechanical coupling connecting the movable members of one pair to those of the other pair of goniometers to produce in the coupled members of the four goniometers four voltages simulating the four voltages produced by two pairs of cross-connected Adcock antennae.

4. In a testing device for direction finders, at least one pair of radio goniometers each having stationary and movable members, means including voltage supply means for producing in the stationary members of the goniometers voltages of the same amplitude and of predetermined phase relationship, a mechanical coupling between the movable members of the goniometers for producing a predeterminately varying phase between voltages produced in the coupled members, means for imparting a pendulum movement to the coupled members, and means for varying the amplitude of the pendulum movement.

5. In a testing device for direction finders, at least two pairs of goniometers each having stationary and movable members, means including voltage supply means for producing in the stationary members of each pair of goniometers voltages of the same amplitude and of predetermined phase relationship, a mechanical coupling between the movable members of each pair of the goniometers for producing a varying phase between voltages produced in the coupled members, said phase varying in a predetermined manner in accordance with the position of the coupled members of each pair, an additional mechanical coupling between the coupled members of one pair and those of the other pair for maintaining a 90° phase between the voltages produced in the coupled members of one pair and those produced in the coupled members of the other pair, means for imparting to the coupled members of each pair a common pendulum movement, and means for varying the amplitude of said movement.

6. In a testing device for direction finders, at least one pair of similar goniometers each having two perpendicular stationary coils and one rotary coil, each stationary coil of one goniometer being connected in parallel to the opposite stationary coil of the other goniometer, a source of voltage connected to a stationary coil of one goniometer, 90° phase-shifting means connecting the source to the other stationary coil of said goniometer, and means for relatively positioning the rotary coils to produce voltages of equal amplitude and varying phase.

7. In a testing device for direction finders, two pairs of similar goniometers, each having a pair of perpendicular stationary coils and a rotary coil, the stationary coil of one goniometer in each pair being connected in parallel to the opposite stationary coil of the other goniometer, a source of signal directly connected to a stationary coil of one goniometer in each pair, a 90° phase-shifting circuit connecting the source to the other stationary coil of said goniometer, means for relatively positioning the rotary coils of each pair to produce voltages of equal amplitude and varying phase, means for imparting to the rotary coils of each pair a harmonic movement, means for maintaining a 90° phase between the harmonic movements of rotary coils of the two pairs, and means for varying the amplitude of the harmonic movement.

8. In combination, two radio goniometers, each including one pair of primary coils and a secondary coil, means for mounting the secondary coils rotatably on parallel axes, and means for imparting to each of said axes an oscillatory movement in a predetermined phase relationship to simulate the effect of a directional antenna system.

9. In combination, four radio goniometers, each including one pair of primary coils and a secondary coil, means for mounting the secondary coils in pairs rotatably on parallel axes, and means for oscillating the secondary coils of each pair synchronously about said axes, one secondary coil of each pair in phase with the other secondary coil, and one pair of secondary coils out of phase with the other pair to simulate the phase difference between the outputs of two directional antenna systems.

10. A combination according to claim 9, wherein the secondary coils of each pair of goniometers are mounted 90° out of phase with respect to each other and wherein the secondary coils of one pair are mounted 90° out of phase with respect to those of the other pair, and means are provided for adjusting the amplitude of the oscillation.

11. A combination according to claim 9, comprising common driving means for the secondary coils, said means including a driven shaft and a driving member driven by the shaft and arranged eccentrically with respect thereto.

12. A combination according to claim 9, comprising common driving means for the secondary coils, said means including a driven shaft, a driving member driven by the shaft and arranged eccentrically with respect thereto, and means for varying the eccentricity of said member.

13. A combination according to claim 9, comprising common driving means for the secondary coils, said means including a driven disc, a pin eccentrically mounted on said disc, at least one link member driven by said pin, shafts supporting the coils of each pair, cranks driving the shafts and driven by the link member to impart to the coils of each pair a reciprocal movement simulating the effect of a uniformly rotating directional antenna system.

14. A combination according to claim 9, comprising common driving means for the secondary coils, said means including a driven disc, a pin eccentrically mounted on said disc, two link members driven by said pin successively and each driving the secondary coils of one pair of goniometers.

15. A combination according to claim 9, comprising common driving means for the secondary coils, said means including a driven disc, a pin eccentrically mounted on said disc, and two link members each having springs attached thereto and each driving the secondary coils of one pair of goniometers synchronously and out of phase, the link members being arranged to reciprocate in directions substantially perpendicular to one another.

16. A combination according to claim 9, comprising two mounting strips arranged perpendicular to one another, each carrying a link member, each link member being mounted for a reciprocal movement in a direction perpendicular to that of the other link member, shafts supporting the secondary coils of each pair of goniometers, cranks attached to said shafts and driven by the link members, a center plate having sides to which the mounting plates are attached, and driving means supported on the center plate and engaging the link members to impart thereto the same reciprocating movements successively.

17. In combination, four radio goniometers, each including one pair of primary coils and a secondary coil, means for mounting the secondary coils in pairs rotatably on co-linear axes, and means for oscillating the secondary coils of each pair synchronously about said axes, one secondary coil of each pair in phase with the other secondary coil, and one pair of secondary coils out of phase with the other pair to simulate the phase difference between two directional antenna systems.

18. An arrangement for producing electrical test signals for testing direction finder signal translating circuits, comprising a source of alternating electrical energy, a resolving unit comprising two components electrically coupled, means for applying energy from said alternating energy source to one of said components, means for varying the degree of coupling between said two components whereby said signal energy is produced in the output of said second component, means for applying the output of said second component to said translating circuit.

19. A method for testing direction finder signal translating circuits comprising the following steps, producing alternating electrical signals, phase shifting certain ones of said signals, combining said alternating energy signals and said phase-shifted signals in a predetermined manner, modulating said last named signals to produce test signals, and applying said test signals to said direction finder translating circuits.

SAMUEL D. BROWNING.

REFERENCES CITED

The following references are of record in the file of this patent:

UNITED STATES PATENTS

| Number | Name | Date |
|---|---|---|
| 2,174,014 | Sullinger et al. | Sept. 26, 1939 |
| 2,174,015 | Sullinger | Sept. 26, 1939 |
| 2,185,029 | Kear et al. | Dec. 26, 1939 |
| 2,285,092 | Holsten | June 2, 1942 |
| 2,297,414 | Janovsky | Sept. 29, 1942 |
| 2,337,968 | Brown | Dec. 28, 1943 |